US008638751B2

(12) United States Patent  
Venkatachalam et al.

(10) Patent No.: US 8,638,751 B2  
(45) Date of Patent: Jan. 28, 2014

(54) COVERAGE LOSS RECOVERY IN A WIRELESS COMMUNICATION NETWORK (75) Inventors: Muthaiah Venkatachalam, Beaverton, OR (US); Xiangying Yang, Portland, OR (US); Shantidev Mohanty, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 701 days.

(21) Appl. No.: 12/826,639

(22) Filed: Jun. 29, 2010

(65) Prior Publication Data

US 2011/0096737 A1 Apr. 28, 2011

Related U.S. Application Data (60) Provisional application No. 61/254,620, filed on Oct. 23, 2009.

(51) Int. Cl.  
*G01R 31/08* (2006.01)  
*H04W 4/00* (2009.01)  
*H04W 36/00* (2009.01)

(52) U.S. Cl.  
USPC ............ 370/331; 370/216; 370/236; 455/436

(58) Field of Classification Search  
USPC ................ 370/216, 236, 331; 455/432.1, 436  
See application file for complete search history.

(56) References Cited

U.S. PATENT DOCUMENTS

2006/0120287 A1* 6/2006 Foti et al. ...................... 370/231  
2007/0218896 A1* 9/2007 Altshuller et al. ......... 455/432.1  
2008/0089292 A1* 4/2008 Kitazoe et al. ................ 370/331  
2009/0191874 A1* 7/2009 Du et al. ........................ 455/436  
2009/0307496 A1* 12/2009 Hahn et al. .................... 713/171  
2010/0081444 A1* 4/2010 Jin et al. ........................ 455/450  
2010/0098247 A1* 4/2010 Suumaki ......................... 380/44  
2010/0238799 A1* 9/2010 Sebire ........................... 370/225  
2010/0278108 A1* 11/2010 Cho et al. ...................... 370/328

FOREIGN PATENT DOCUMENTS

WO 2008114183 A1 9/2008  
WO 2008131401 A1 10/2008

OTHER PUBLICATIONS

International Search Report issued May 25, 2011 from International Application No. PCT/US2010/049270.  
Jang et al., "Handover Enhancements," IEEE C802.16m-09/0185r1, IEEE 802.16 Broadband Wireless Access Working Group, Jan. 5, 2009, pp. 1-6.

(Continued)

*Primary Examiner* — Redentor Pasia  
(74) *Attorney, Agent, or Firm* — Schwabe, Williamson & Wyatt, P.C.

(57) ABSTRACT

Embodiments of the present disclosure describe methods, apparatus, and system configurations for coverage loss recovery in a wireless communication network. A method includes receiving, by a base station of a wireless communication network, a message from a mobile station that includes an indication that the mobile station is in coverage loss recovery, and a mobile station identifier to identify the mobile station. The method further includes determining whether a static context and/or a dynamic context associated with the mobile station identifier is stored at a previous-serving base station of the mobile station and transmitting a message to the mobile station to indicate which re-entry actions are to be performed to facilitate re-entry of the mobile station to the wireless communication network. Other embodiments may be described and/or claimed.

26 Claims, 7 Drawing Sheets

(56) References Cited

OTHER PUBLICATIONS

Chou et al., "Proposed Changes to Handover Procedure (15.2.5.10/15.2.7.2.9)," IEEE C802.16m-09/1888, IEEE 802.16 Broadband Wireless Access Working Group, Aug. 28, 2009, pp. 1-8.

Liu et al., "Proposed text on coverage loss (section 15.2.x and 15.2.6x)," IEEE C802.16m-09/1787r2, IEEE 802.16 Broadband Wireless Access Working Group, Sep. 1, 2009, pp. 1-8.

LG Electronics, "Re-entry optimization (15.3.10)," IEEE C802.16m-09/1837, IEEE 802.16 Broadband Wireless Access Working Group, Aug. 29, 2009, pp. 1-11.

U.S. Appl. No. 12/851,841, filed Aug. 6, 2010.

U.S. Appl. No. 12/839,619, filed Jul. 20, 2010.

IEEE Computer Society and IEEE Microwave Theory and Techniques Society, "Part 16: Air Interface for Broadband Wireless Access Systems," IEEE Std 820.16-2009 (Revision of IEEE Std 802.16-2004), May 29, 2009, New York, NY, USA.

IEEE Computer Society and IEEE Microwave Theory and Techniques Society, "Part 16: Air Interface for Fixed and Mobile Broadband Wireless Access Systems," Draft Amendment to IEEE Standard for Local and Metropolitan Area Networks, IEEE P802.16m/D5, Apr. 2010, New York, NY.

Office Action issued on Jul. 30, 2013 from Japanese Patent Application No. 2012-535210.

IEEE 802.16 Broadband Wireless Access Working Group, "Proposed text on coverage loss" (section 15.2x and 15.2.6x), Sep. 21, 2009.

Office Action issued Aug. 20, 2013 from Korean Patent Application No. 10-2012-7010065.

IEEE 802.16 Broadband Wireless Access Working Group, "Proposed text on coverage loss" (section 15.2 x and 15.2.6x), Sep. 21, 2009.

Office Action issued Sep. 20, 2013 from Russian Patent Application No. 2012121186.

\* cited by examiner

COVERAGE LOSS RECOVERY IN A WIRELESS COMMUNICATION NETWORK

CROSS REFERENCE TO RELATED APPLICATIONS

The present application claims priority to U.S. Provisional Patent Application No. 61/254,620, filed Oct. 23, 2009.

FIELD

Embodiments of the present disclosure generally relate to the field of wireless communication systems, and more particularly, to methods, apparatuses, and system configurations for coverage loss recovery in a wireless communication network.

BACKGROUND

Mobile networks that facilitate transfer of information at broadband rates continue to be developed and deployed. Such networks may be colloquially referred to herein as broadband wireless access (BWA) networks and may include networks operating in conformance with one or more protocols specified by the $3^{rd}$ Generation Partnership Project (3GPP) and its derivatives, the WiMAX Forum, or the Institute for Electrical and Electronic Engineers (IEEE) 802.16 standards (e.g., IEEE 802.16-2009 Amendment), although the embodiments discussed herein are not so limited. IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards.

A variety of different device types may be used in broadband wireless technologies. Such devices may include, for example, personal computers, handheld devices, and other consumer electronics such as music players, digital cameras, etc., that are configured to communicate over the BWA networks. A mobile station using a BWA network, such as WiMAX, may experience a loss of radio link communication with the BWA network for any of a variety of reasons including, for example, loss of coverage of a radio signal. Generally, the mobile station must perform full network entry including at least full authentication and capability negotiation to re-enter the wireless communication network.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure provide techniques and configurations for coverage loss recovery in a wireless communication network. In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

While example embodiments may be described herein in relation to broadband wireless access for wireless metropolitan area networks (WMANs) such as WiMAX networks, embodiments of the present disclosure are not limited thereto and can be applied to other types of wireless networks where similar advantages may be obtained. Such networks include, but are not limited to, wireless local area networks (WLANs), wireless personal area networks (WPANs) and/or wireless wide area networks (WWANs) such as cellular networks and the like.

The following embodiments may be used in a variety of applications including transmitters and receivers of a mobile wireless radio system. Radio systems specifically included within the scope of the embodiments of the present disclosure include, but are not limited to, network interface cards (NICs), network adaptors, base stations, access points (APs), gateways, bridges, hubs and satellite radiotelephones. Further, the radio systems within the scope of embodiments of the present disclosure may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

Figure 1:
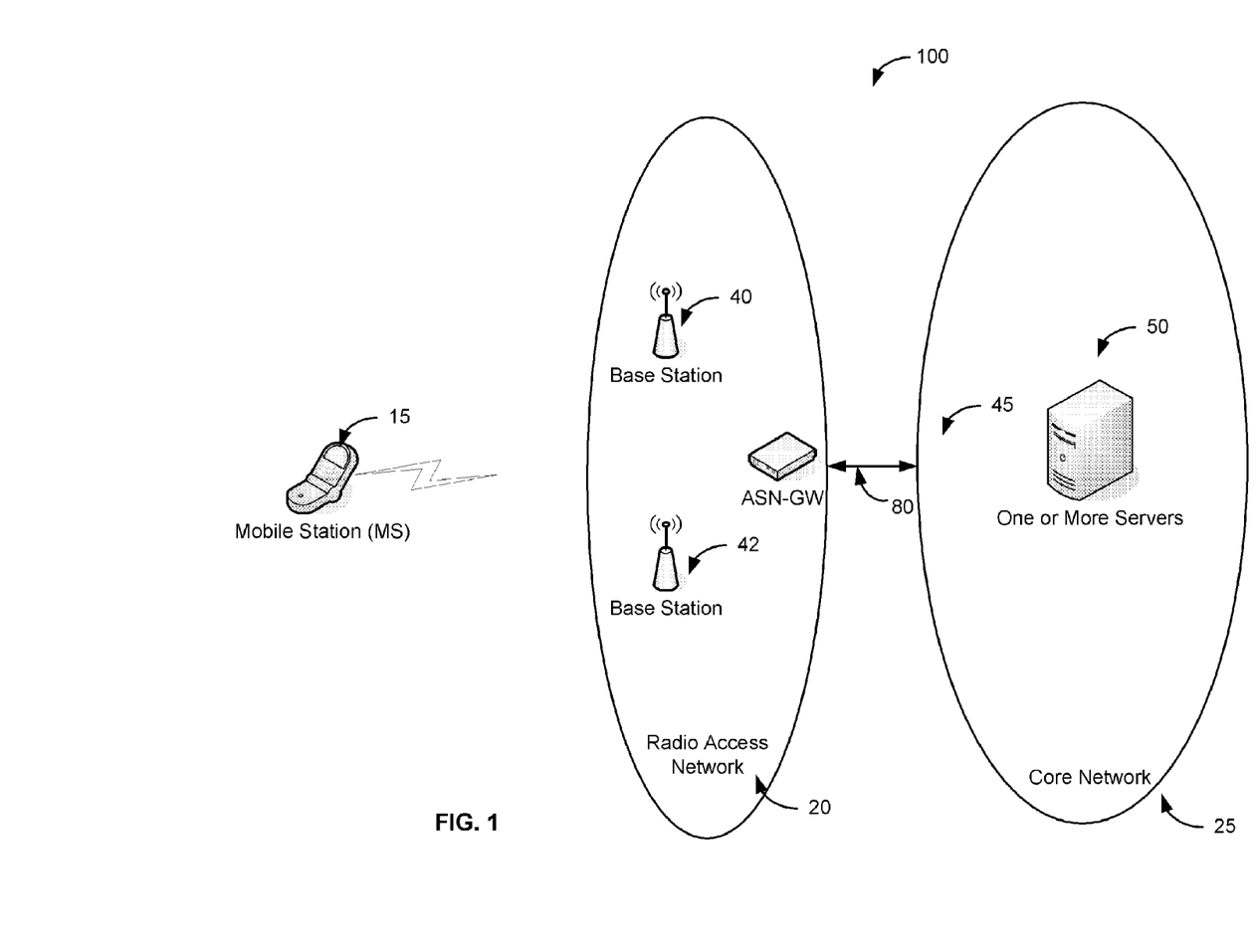
FIG. 1 schematically illustrates an example broadband wireless access (BWA) network architecture, in accordance with some embodiments.

FIG. 1 schematically illustrates an example broadband wireless access (BWA) network 100 in accordance with some embodiments. The BWA network 100 may be a network having one or more radio access networks (RANs), including RAN 20, and a core network 25.

A mobile station (MS) 15 may access the core network 25 via a radio link with a base station (BS) (e.g., BS 40, 42, etc.) in the RAN 20. The MS 15 may, for example, be a station establishing and using a working connection with the BWA network 100 using protocols compatible with the IEEE 802.16 standards (e.g., IEEE 802.16-2009, approved May 13, 2009 or IEEE 802.16m Draft 5, approved April 2010) or WiMAX standards, such as Network Working Group (NWG) Rel 1.5 Standard or variants thereof. The base stations 40, 42 may be configured to transmit/receive messages between the MS 15 and the core network 25. While FIG. 1 generally depicts the MS 15 as a cellular phone, in various embodiments the MS 15 may be a personal computer (PC), notebook, an ultra mobile PC (UMPC), a handheld mobile device, an universal integrated circuit card (UICC), a personal digital assistant (PDA), a Customer Premise Equipment (CPE), or other consumer electronics such as MP3 players, digital cameras, and the like.

In some embodiments, communication with the MS 15 via RAN 20 may be facilitated via one or more access service network gateways (ASN-GWs), e.g., ASN-GW 45, although the embodiments are not limited to this specific type of network implementation. ASN-GW 45 (or another similar type of network node) may act as an interface between the core network 25 and RAN 20. Thus, ASN-GW 45 may be communicatively coupled to a plurality of base stations 40, 42 and may function as a type of BS controller and/or mobile switching center (MSC) to facilitate handover control and other functions for RAN 20, although the embodiments are not so limited. In a WiMAX setting, the RAN 20 may comprise an access service network (ASN) of a Network Access Provider (NAP) and the core network 25 may comprise a connectivity service network (CSN) of a Network Service Provider (NSP).

The core network 25 may include logic (e.g., a module) to activate/manage the MS 15 or other actions associated with the MS 15. For example, the core network 25 generally includes one or more servers 50. The one or more servers can include, for example, an authentication, authorization, and accounting (AAA) server, an OMA-DM server, a provisioning server, a bootstrapping server, a subscription server, and/or a Home Agent (HA). The one or more servers 50 may be communicatively coupled to the base stations 40, 42 through a communication link 80 to transmit/receive messages associated with managing/operating the MS 15 in the BWA network 100. The one or more servers 50 may be referred to as over-the-air (OTA) servers. In some embodiments, the logic associated with the different functionalities of the one or more servers 50 may be combined to reduce the number of servers, including, for example, being combined in a single machine.

Figure 2:
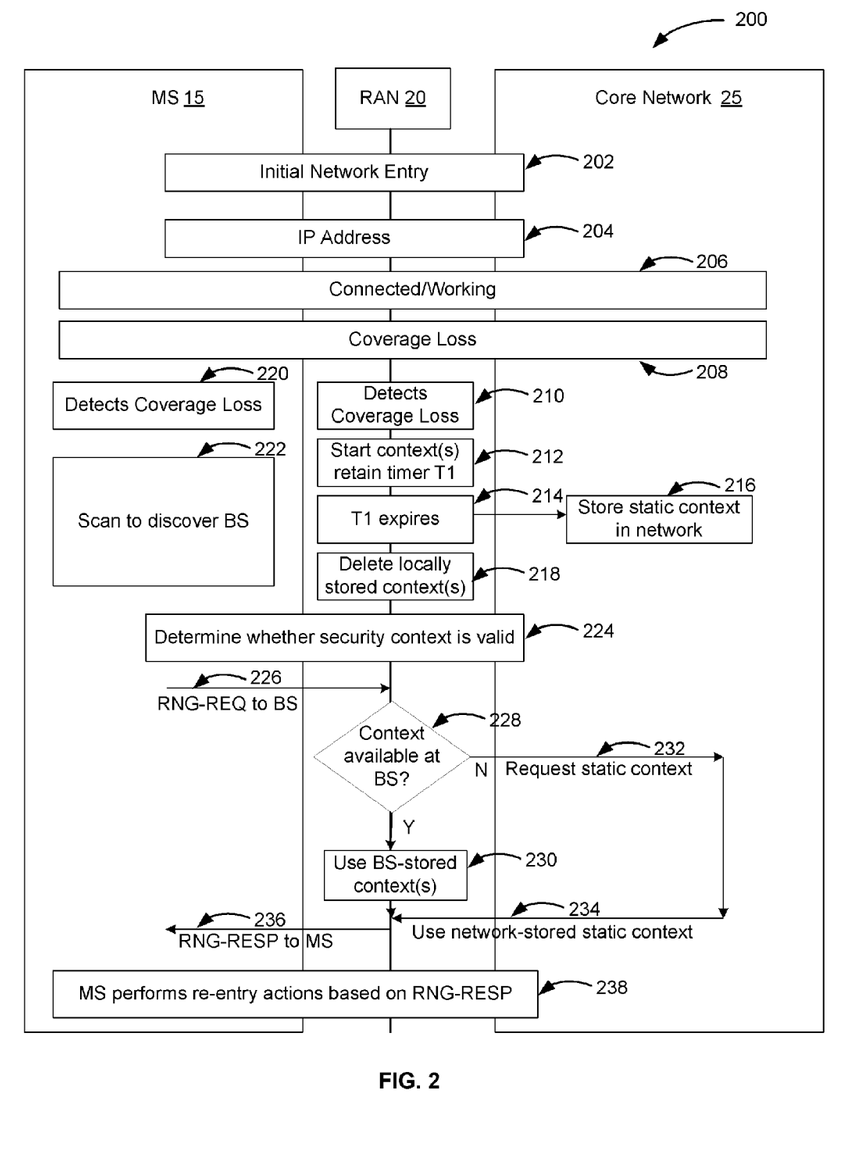
FIG. 2 schematically illustrates an example coverage loss recovery flow for a wireless communication network, in accordance with some embodiments.

FIG. 2 schematically illustrates an example coverage loss recovery flow 200 for a wireless communication network (e.g., BWA network 100), in accordance with some embodiments. Referring to FIGS. 1 and 2, actions associated with initial network entry at 202 are performed by a wireless communication device (e.g., MS 15) to enter the wireless communication network (e.g., BWA network 100). For example, the MS 15 may enter a coverage area for a NSP of the BWA network 100. The MS 15 may perform actions associated with network discovery and selection (ND&S), such as scanning and detecting an advertisement for the NSP that is wirelessly transmitted by a transmitter (e.g., the BS 40 of RAN 20) of the BWA network 100. The MS 15 may perform additional actions including, for example, ranging, capability negotiation, authentication, authorization, and/or registration.

The actions associated with initial network entry at 202 may include communication with the core network 25. For example, actions associated with authentication may be performed by the OTA servers (e.g., AAA server) in wireless communication with the MS 15 via a base station (e.g., BS 40) and may be performed using, for example, Extensible Authentication Protocol (EAP). According to some embodiments, the one or more servers 50 may perform authentication for networks that do not use OTA functionality such as OTA provisioning.

After initial network entry at 202 of the MS 15 into the BWA network 100, the MS 15 may obtain an internet protocol (IP) address at 204 to establish a data path with the BWA network 100 and/or the OTA servers. The IP address may be provided, for example, by a server in a connectivity service network (CSN) of the BWA network 100 using a Dynamic Host Configuration Protocol (DHCP). Other configurations and/or protocols may be supported. After obtaining the IP address at 204, the MS 15 may be connected to the BWA network 100 at 206.

The MS 15 may experience coverage loss at 208. Embodiments described herein facilitate re-entry of a wireless communication device (e.g., MS 15) to the BWA network 100 after the wireless communication device experiences coverage loss. Coverage loss (e.g., at 208), as used herein, refers broadly to any situation where the wireless communication device loses radio link communication with the BWA network 100. Embodiments described herein, for example, may eliminate or reduce a number of actions to be performed by the wireless communication device to re-enter the BWA network 100 after experiencing coverage loss.

The RAN 20 may detect the coverage loss at 210. For example, the last-serving base station (e.g., the BS 40) may send an unsolicited periodic ranging command, an unsolicited grant or some other type of Medium Access Code (MAC) message if there is no detected radio activity from the MS 15 for a pre-determined amount of time. If the BS 40 does not receive a response to the message sent by the BS 40 within a pre-determined amount of time, the BS 40 detects that the MS 15 is in a coverage loss state at 210. Other types of scenarios that ping the MS 15 can be used by the BS 40 to detect coverage loss at 210.

Prior to describing subsequent coverage loss recovery actions of flow 200, one or more contexts associated with the MS 15 are described. One or more contexts associated with the MS 15 may be maintained and/or stored by the RAN 20 or the core network 25 to facilitate re-entry of the MS 15 to the BWA network 100 by providing information that allows the MS 15 and other BWA network entities such as the BS 40 to eliminate or reduce a number of re-entry actions to be performed prior to re-entry of the MS 15 to the BWA network. The one or more contexts may include a static context and/or a dynamic context.

The static context may be generally valid for different transmitting stations (e.g., BS 40 or BS 42) of a NAP domain.

The static context may include information that is associated with network domain addressing, security context, paging, capability, service flow, and Layer 3 (L3) configuration for the MS 15. According to various embodiments, the addressing information includes, for example, a mobile station identifier (MSID) to uniquely identify the mobile station in the BWA network 100, a base station identifier (BSID) to identify the last-serving base station (e.g., BS 40) for the MS 15 or the base station where a last location update (LU) or network entry/re-entry attempt is performed by the MS 15, and/or a MAC address of the MS 15.

The MSID may be a hashed 48-bit version of a 48-bit MAC address of the MS 15 for privacy protection, or the 48-bit MAC address itself when privacy protection is not enabled. In an embodiment, the MSID is the last MSID used to establish a security context with the BS 40 (e.g., during authentication at initial network entry 202). For example, the MSID may be an identifier presented to the BS 40 by the MS 15 prior to being authenticated. Security keys shared between the BS 40 and the MS 15 such as an Authentication Key (AK) and derivative keys may be derived using the MSID. The static context may be indexed by the MSID and/or BSID.

According to various embodiments, the security context information of the static context includes a master session key (MSK), a pairwise master key (PMK), and/or a Cipher-based Message Authentication Code (CMAC) Key Count. The paging information of the static context may include a Paging Group Identifier (PGID) and/or a Deregistration with Context Retention (DCR)-mode identifier (DID). The capability information of the static context may include information associated with hardware capabilities of the MS 15. The service flow information of the static context may include information associated with subscribed services of the MS 15. The L3 configuration information may include an IP address and associated information.

Turning to the dynamic context, the dynamic context may be generally valid for a particular BS (e.g., BS 40) of the NAP domain. The dynamic context may, for example, include information associated with low-level security keys such as AK and derivative keys, Automatic Repeat Request (ARQ) buffer and states, or cell-specific identifiers on an air interface such as a Station Identifier (STID).

The one or more contexts associated with the MS 15 can be stored, either at the RAN 20 (e.g., the last-serving base station of the MS 15) or the core network 25, or both, according to various techniques described herein. For example, the maintenance/storage of the one or more contexts may depend on whether the MS 15 is in idle mode or active mode. For the sake of clarity, flow 200 only depicts the maintenance/storage of the one or more contexts for a connected/working MS 15 in active mode at actions at 210, 212, 214, 216, and 218. However, the maintenance/storage of the one or more connected/working MW 15 in idle mode is described in connection with FIG. 4 and can replace or be combined with the techniques described in the flow 200, according to various embodiments.

Returning to the flow 200 at 212, the last-serving base station (e.g., BS 40) may start a context(s) retain timer, T1, in response to detecting the coverage loss at 210, according to various embodiments. The context(s) retain timer T1 defines a time period in which the last-serving base station maintains or locally stores one or more contexts associated with the MS 15 in coverage loss. The one or more contexts are locally stored at the last-serving base station during context(s) retain timer T1 to facilitate re-entry to the BWA network 100 if the MS 15 returns to the BWA network 100 prior to the expiration of T1. In an embodiment, the last-serving base station locally stores or caches both the static context and the dynamic context associated with the MS 15. According to various embodiments, the context(s) retain timer T1 has a time period on the order of seconds, but is not necessarily limited in this regard.

In response to the expiration of the context(s) retain timer, T1, at 214, the last-serving base station pushes and stores the static context associated with the MS 15 in the core network 25 at 216. For example, the last-serving base station (e.g., BS 40) may signal a network node (e.g., ASN-GW 45) to cache the static context in the core network 25. The core network 25 may operate a timer during which the static context is maintained/stored in the core network. The static context stored in the core network 25 may be deleted in response to expiration of the timer. According to various embodiments, the timer associated with storing the static context in the core network 25 has a time period on the order of hours, but is not necessarily limited in this regard.

At 218, the last-serving base station deletes the locally stored contexts on the RAN 20 side. In an embodiment, the last-serving base station deletes the dynamic context and the static context associated with the mobile station from the last-serving base station subsequent to signaling the network node to cache the static context in the network. To be clear, the actions described as being performed by the last-serving base station herein can be performed by a module of the RAN 20 that is external to the last-serving base station.

Turning now to the MS 15 side after coverage loss at 208, the MS 15 may detect coverage loss at 220 according to a variety of techniques. For example, the MS 15 may detect coverage loss by monitoring a radio channel used to communicate in the wireless communication network. Coverage loss may be detected when the MS 15 loses synchronization such as, for example, Physical layer (PHY) synchronization, downlink (DL) synchronization, or uplink (UL) synchronization. Other principles to detect coverage loss at the MS 15 may be used in other embodiments.

The coverage loss detection actions of the last-serving base station at 210 and the context(s) retain timer T1 may provide sufficient time to allow the MS 15 to detect coverage loss at 220 or to perform periodic ranging so that a possibility of unsynchronized states between the MS 15 and the last-serving base station is reduced. The "unsynchronized states" refers to a condition where the last-serving base station detects coverage loss and the MS 15 does not, or vice versa.

Subsequent to detecting the coverage loss, the MS 15 scans or performs periodic ranging to discover a RAN 20 (e.g., BS 40) to re-enter the BWA network 100. The MS 15 may, for example, scan and detect the last-serving base station (e.g., BS 40) or another base station (e.g., BS 42) of the BWA network 100.

The MS 15 may communicate with the detected base station to determine whether a security context used to provide secure communication between the MS 15 and the BWA network 100 is still valid. For example, the MS 15 may receive a message via the detected base station that indicates that the BWA network 100 is valid or expired. The security context may be valid for a shorter time than other contexts of the static context due to security considerations. For example, if the security context or static context is expired in the core network 25, full authentication may be required for re-entry of the MS 15 to the BWA network 100. In another example, if the MS 15 loses coverage in a BWA network 100 that operates according to IEEE 802.16m and re-enters a BWA network 100 that operates according to another protocol, the security context may be invalid and full authentication may be performed for re-entry of the MS 15 to the BWA network 100. When a security context is invalid, the network may still keep the MSID of the MS 15 as an index so that when the MS 15 attempts to re-enter the BWA network 100, the MSID can be used to look up another security context for the MS 15 that has not expired.

At 226, the MS 15 sends a message such as a ranging request (RNG-REQ) message to the detected base station. The message includes an indication that the MS 15 is in coverage loss recovery. In an embodiment, the message includes a coverage loss recovery bit to indicate that the MS 15 is in coverage loss recovery. The coverage loss recovery bit, for example, may be bit#7 in a Ranging Purpose Indication parameter of a RNG-REQ message. If bit#7 is set to 1, then the MS 15 is in coverage loss recovery.

The message sent by the MS 15 at 226 may further include the last-used MSID to facilitate identification of any stored, indexed contexts associated with the MSID at the RAN 20 or the core network 25. Another network assigned ID may be used if MS has previously obtained such ID assignment. The message sent by the MS 15 may further include the BSID of the last-serving (e.g., last associated) base station. In an embodiment, the BSID is only included in the message if the detected base station (e.g., BS 42) at 222 for re-entry to the network 100 is different than the last-serving base station (e.g., BS 40) thus reducing overhead of transmitted information in the BWA network 100.

The message sent by the MS 15 may further include authentication code information to facilitate secure communication between the base station and the mobile station. According to various embodiments, the authentication code information includes a CMAC digest. Key usage may be the same as used in a hand-over (HO) re-entry scheme as defined in the IEEE 802.16 specification. In an embodiment, the authentication code information may further include a CMAC Key Count when the detected base station (e.g., BS 42) is different than the last-serving base station (e.g., BS 40). Key refresh may be performed if the detected base station (e.g., BS 42) is different than the last-serving base station (e.g., BS 40). The MS 15 may derive the AK and other CMAC keys from higher level MSK/PMK (e.g., which may be part of static context) using the BSID of the detected base station if requested by the core network 25.

It is noted that actions of the flow 200 that occur subsequent to the coverage loss 208 may occur in an order that is different than what is depicted. This may be due to the uncertainty of length of time of coverage loss by the MS 15, which may range, for example, from the order of seconds to the order of hours depending on the situation. For example, according to various embodiments, the MS 15 may send the message at 226 prior to or subsequent to expiration of the context(s) retain timer T1 at 212. For another example, the base station detected at 222 may determine whether one or more contexts are available at the last-serving base station at 228 prior to or subsequent to expiration of the context(s) retain timer T1 at 212.

At 228, the base station detected at 222 determines whether one or more contexts (e.g., dynamic and/or static) are available at the last-serving base station. In one embodiment, the detected base station checks to determine whether the one or more contexts are locally available (e.g., not yet deleted at 218) if the base station (e.g., BS 40) detected at 222 is the same as the last-serving base station (e.g., BS 40). The detected base station may check to determine whether the one or more contexts are locally available by searching for the one or more contexts indexed by MSID in a storage medium associated with the detected base station.

In another embodiment, if the base station (e.g., BS 42) detected at 222 is different than the last-serving base station (e.g., BS 40), then the detected base station checks to determine whether the one or more contexts are available at the last-serving base station. The detected base station can, for example, establish a logical link (e.g., via R8-type interface) with the last-serving base station using the BSID provided in the message sent by the MS 15 at 226 to identify the last-serving base station. The detected base station may check to determine whether the one or more contexts are available at the last-serving base station by searching for the one or more contexts indexed by MSID in a storage medium associated with the last-serving base station.

If the one or more contexts are found at the last-serving base station at 228, then the one or more base station-stored contexts are used at 230 to determine what information associated with re-entry instructions is to be included in a message such as a ranging response (RNG-RESP) message to the MS 15 at 236. However, if the one or more contexts are not found at the last-serving base station at 228, the base station detected at 222 may signal a network node (e.g., ASN-GW 45 via R6-type interface) to request the static context at 232 stored in the core network 25 at 216 using the MSID and/or BSID information sent in the message from the MS 15 at 226. At 234, the network-stored static context is used at 230 to determine what information associated with re-entry instructions is to be included in the message to the MS 15 at 236.

The base station sends the message to the MS 15 at 236 to indicate which re-entry actions (e.g., MAC control messages) are to be performed to facilitate re-entry of the MS 15 to the BWA network 100. In an embodiment where the base station detected at 222 uses a dynamic context and a static context stored at the last-serving base station at 230, the message sent to the MS at 236 indicates that the re-entry actions include a partial authentication including an authentication code exchange. Additionally or alternatively, the message sent to the MS at 236 may indicate that the re-entry actions include a request that the mobile station maintain a previous automatic repeat request (ARQ) state of the mobile station and that the mobile station update the ARQ state via an explicit acknowledgement to the base station. The re-entry actions may indicate that only a quick authentication code exchange in MAC messages is to be performed for re-entry of the MS 15 to the BWA network 100. To be clear, the re-entry actions in such embodiment do not include full authentication and capability negotiation and, thus, allow that MS 15 to re-enter the BWA network without performing full authentication and capability negotiation actions. Such re-entry actions may generally follow a handover process scheme defined in IEEE 802.16 according to various embodiments.

In another embodiment where the base station detected at 222 uses the static context stored in the network core 25 at 234, the message sent to the MS at 236 indicates that the re-entry actions include a partial authentication including an authentication code exchange and resetting of a MAC layer data path. That is, the re-entry actions may indicate that only a quick authentication code exchange in MAC messages and resetting/restarting the MAC layer data path (e.g., STID, ARQ buffer, etc.) are to be performed for re-entry of the MS 15 to the BWA network 100. To be clear, the re-entry actions in such embodiment do not include full authentication and capability negotiation and, thus, allow the MS 15 to re-enter the BWA network without performing full authentication and capability negotiation actions. Such re-entry actions may generally follow an idle mode re-entry scheme defined in IEEE 802.16 according to various embodiments.

The re-entry actions may be indicated in one or more MAC control messages or a re-entry optimization bitmap included in the message at 236. The message sent to the MS at 236 may further include the CMAC digest.

At 238, the MS 15 performs re-entry actions based on the re-entry actions indicated in the message received at 236. In a case where the base station detects coverage loss at 210 and the MS 15 does not detect coverage loss at 220 (e.g., unsynchronized states), the MS may try to resume its normal connect/working operations at 206 with the last-serving base station. The last-serving base station may allow the MS 15 to resume normal operation without requiring re-entry to the BWA network 100. That is, the MS 15 may not send a message to the base station at 226 in such a scenario. The last-serving base station may only request that the MS 15 perform PHY layer synchronization or adjustment.

Figure 3:
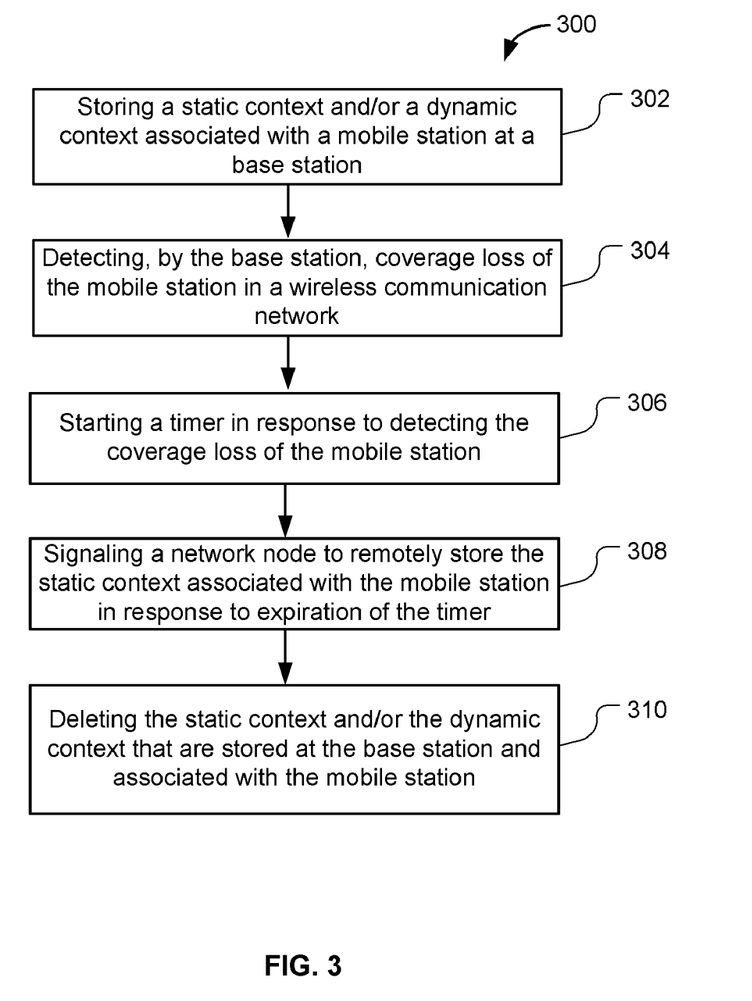
FIG. 3 is a flow diagram of a method for storing one or more contexts associated with a mobile station, in accordance with some embodiments.

FIG. 3 is a flow diagram of a method 300 for storing one or more contexts associated with a mobile station, in accordance with some embodiments. In an embodiment, method 300 is performed subsequent to coverage loss (e.g., 208 of FIG. 2) by a base station (e.g., the BS 40 of FIG. 1) that is communicatively coupled with a mobile station in active mode (e.g., as opposed to idle mode) when coverage loss (e.g., 208 of FIG. 2) occurs. According to various embodiments, the actions of method 300 are performed by a base station of a radio access network (e.g., RAN 20 of FIGS. 1-2) or a module of the radio access network communicatively coupled with the base station.

At 302, the method 300 includes storing a static context and/or a dynamic context associated with a mobile station at a base station. According to various embodiments, both the static context and the dynamic context are stored at the base station.

At 304, the method 300 further includes detecting, by the base station, coverage loss of a mobile station (e.g., MS 15 of FIGS. 1-2) in a wireless network. At 306, the method 300 further includes starting a timer (e.g., the context(s) retain timer T1 at 212 of FIG. 2) in response to detecting the coverage loss of the mobile station. At 308, the method 300 further includes signaling a network node (e.g., ASN-GW 45 of FIG. 1) to remotely store (e.g., in the core network 25 of FIG. 2) the static context associated with the mobile station based on or in response to expiration of the timer. At 310, the method 300 further includes deleting the static context and/or the dynamic context that are stored at the base station and associated with the mobile station. The dynamic and static context may be deleted subsequent to signaling the network node.

Figure 4:
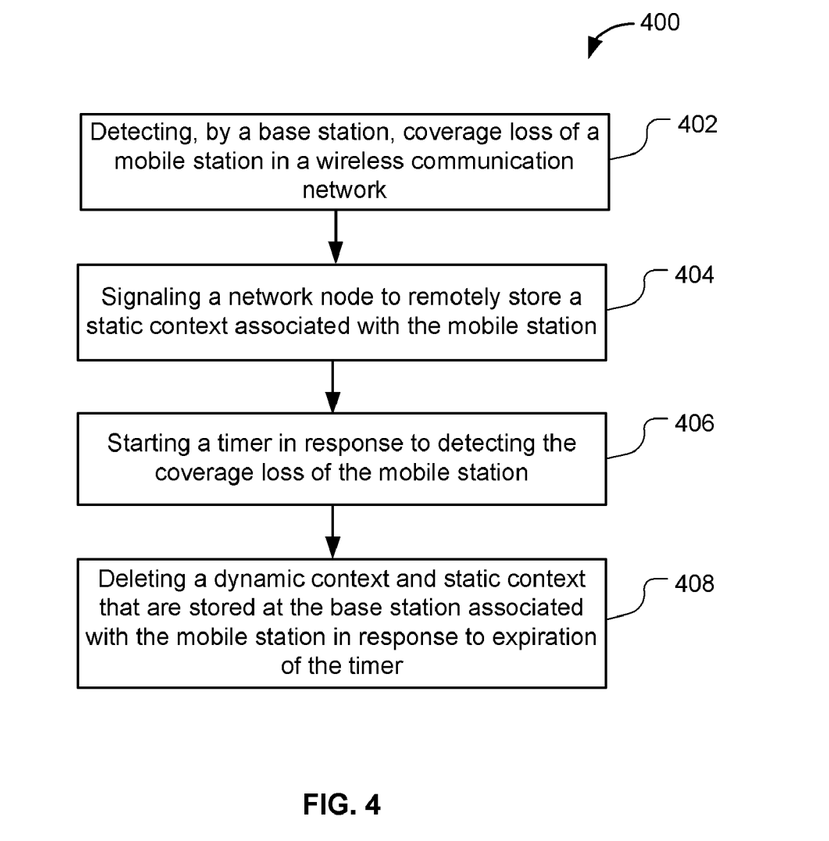
FIG. 4 is a flow diagram of another method for storing one or more contexts associated with a mobile station, in accordance with some embodiments.

FIG. 4 is a flow diagram of another method 400 for storing one or more contexts associated with a mobile station, in accordance with some embodiments. In an embodiment, actions of method 400 are performed prior to and/or subsequent to coverage loss (e.g., 208 of FIG. 2) by a base station (e.g., the BS 40 of FIG. 1) that is communicatively coupled with a mobile station in idle mode (e.g., as opposed to active mode) when coverage loss (e.g., 208 of FIG. 2) occurs. According to various embodiments, the actions of method 400 are performed by a base station of a radio access network (e.g., RAN 20 of FIGS. 1-2) or a module of the radio access network communicatively coupled with the base station.

At 402, the method 400 includes detecting, by a base station, coverage loss of a mobile station in a wireless communication network. At 404, the method 400 further includes signaling a network node to remotely store a static context associated with the mobile station. The static context may be associated with the MSID of the mobile station for paging purposes. According to various embodiments, signaling the network node at 404 may be performed prior to or subsequent to detecting the coverage loss at 402. In one embodiment, signaling the network node at 404 is performed when the base station detects that the mobile station is in an idle mode. The signaling at 404 may be performed in response to said detecting the coverage loss at 402 in various embodiments. At 406, the method 400 further includes starting a timer in response to detecting the coverage loss of the mobile station. At 408, the method 400 further includes deleting a dynamic context and static context that are stored at the base station and associated with the mobile station (e.g., by MSID), said deleting being in response to expiration of the timer.

Figure 5:
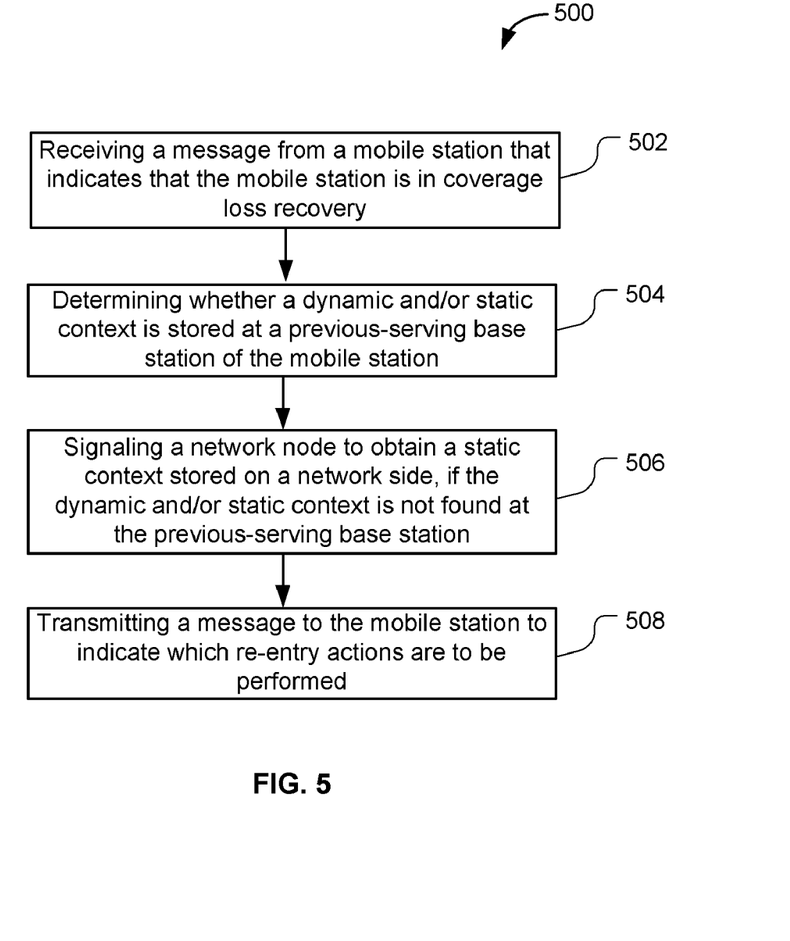
FIG. 5 is a flow diagram of a method for coverage loss recovery, in accordance with some embodiments.

FIG. 5 is a flow diagram of a method 500 for coverage loss recovery, in accordance with some embodiments. The method 500 may be performed by a transmitter/receiver (e.g., the BS 40 of FIG. 1) of a radio access network (e.g., RAN 20 of FIGS. 1-2) or a module communicatively coupled to the transmitter/receiver.

At 502, the method 500 includes receiving a message (e.g., RNG-REQ at 226 of FIG. 2) from a mobile station (e.g., MS 15 of FIGS. 1-2) that indicates that the mobile station is in coverage loss recovery. A loss recovery bit may be used to indicate that the mobile station is in coverage loss recovery. The message from the mobile station may further include a mobile station identifier (e.g., MSID) to identify the mobile station. The message from the mobile station may further include a base station identifier (e.g., BSID) if the base station receiving the message is different from a previous-serving base station of the mobile station. The previous-serving base station may be a last-serving base station of the mobile station prior to coverage loss. The base station identifier may be used to facilitate determining whether a dynamic context and/or a static context is stored at a previous-serving base station of the mobile station at 504. The message from the mobile station may further include a cipher-based message authentication code (CMAC) digest to facilitate secure communication between the base station and the mobile station.

At 504, the method 500 further includes determining whether a dynamic context and/or a static context is stored at a previous-serving base station of the mobile station. If the base station receiving the message from the mobile station at 502 is the same as the previous-serving base station, then the base station may check local base station storage using the mobile station identifier to locate and obtain a dynamic context and/or static context. If the base station receiving the message from the mobile station at 502 is different than the previous-serving base station, then the base station may establish a logical link with the previous-serving base station using the base station identifier and locate and obtain the dynamic context and/or static context using the mobile station identifier.

At 506, the method further includes signaling a network node to obtain a static context associated with the mobile station identifier and stored on a network side (e.g., the core network 25 of FIGS. 1-2) if the base station is unable to locate the dynamic context and/or the static context at the previous-serving base station of the mobile station.

At 508, the method 500 further includes transmitting a message (e.g., RNG-RESP to MS at 236 of FIG. 2) to the mobile station to indicate which re-entry actions are to be performed. The re-entry actions may include substantially fewer actions than performed by a mobile station performing initial network entry to facilitate a rapid re-entry to the network (e.g., BWA network 100) after temporary coverage loss of the mobile station. The re-entry actions indicated in the message to the mobile station at 508 may be based in part on said determining whether the dynamic context and/or the static context is stored at the previous-serving base station of the mobile station at 504.

In one embodiment, if it is determined that the dynamic context associated with the mobile station identification is stored at the previous-serving base station of the mobile station, then the message to the mobile station may indicate that the re-entry actions include (i) a partial authentication including an authentication code exchange. The re-entry actions do not include, for example, (i) full authentication and (ii) capability negotiation.

In another embodiment, if it is determined that the dynamic context associated with the mobile station identification is not stored at the previous-serving base station of the mobile station, then the message to the mobile station may indicate that the re-entry actions include (i) partial authentication including an authentication code exchange and (ii) resetting of a MAC layer data path. The re-entry actions do not include, for example, (i) full authentication and (ii) capability negotiation.

Figure 6:
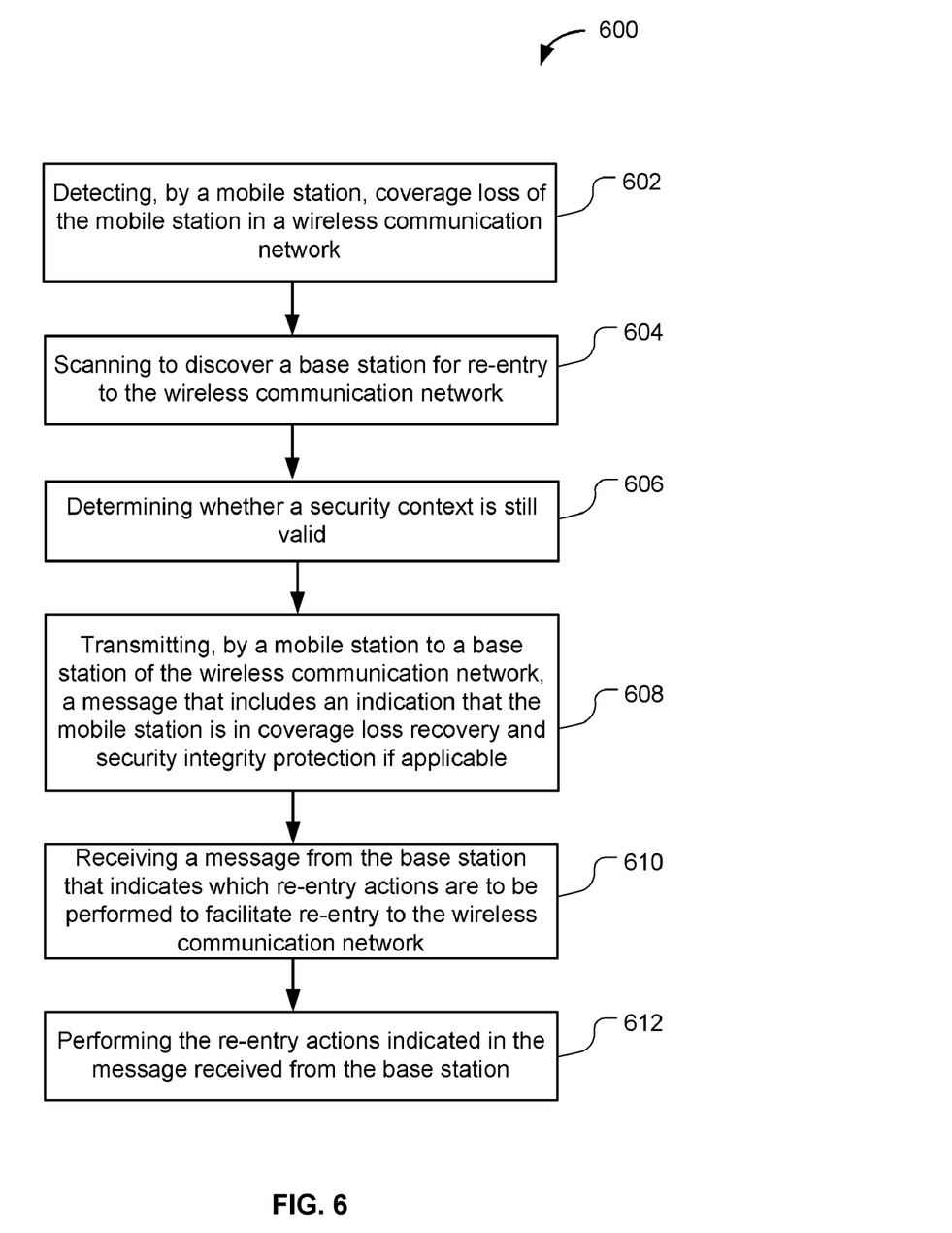
FIG. 6 is flow diagram of another method for coverage loss recovery, in accordance with some embodiments.

FIG. 6 is flow diagram of another method 600 for coverage loss recovery, in accordance with some embodiments. The method 600 may be performed by a mobile station (e.g., MS 15 of FIGS. 1-2) of a wireless communication network (e.g., BWA network 100 of FIG. 1).

At 602, the method 600 includes detecting, by a mobile station, coverage loss of the mobile station in a wireless communication network. At 604, the method 600 further includes scanning to discover a base station (e.g., the BS 40 of FIG. 1) for re-entry to the wireless communication network. The scanning may include, for example, periodic ranging, After a base station has been discovered for re-entry of the mobile station to the wireless communication network, the mobile station determines whether a security context associated with the mobile station is still valid in the wireless communication network. If the security context is invalid, the mobile station may need to perform full authentication as requested by entities (e.g., AAA server of the core network 25 of FIG. 1 or the BS 40 of FIG. 1) of the wireless communication network. The mobile station may, for example, derive a new message authentication code.

At 608, the method 600 further includes transmitting, by the mobile station to a base station of the wireless communication network, a message (e.g., RNG-REQ to BS at 226 of FIG. 2) that includes an indication that the mobile station is in coverage loss recovery and security integrity protection if applicable. A loss recovery bit may be used to indicate that the mobile station is in coverage loss recovery. The message to the base station may further include a mobile station identifier (e.g., MSID). The message to the base station may further include a base station identifier (e.g., BSID). For example, the message to the base station may include the BSID if the base station intended to receive the message from the mobile station is different from a previous-serving (e.g., last-serving) base station of the mobile station. The message to the base station may further include a CMAC digest if applicable (e.g., requested by the network). The message to the base station may further include a newly derived message authentication code and/or a request for a full authentication to refresh all security keys if it is determined that the security context is not valid at 606.

At 610, the method 600 further includes receiving a message (e.g., RNG-RESP to MS at 236 of FIG. 2) from the base station that indicates which re-entry actions are to be performed to facilitate re-entry of the mobile station to the wireless communication network. At 612, the method 600 further includes performing the re-entry actions indicated in the message received from the base station.

Figure 7:
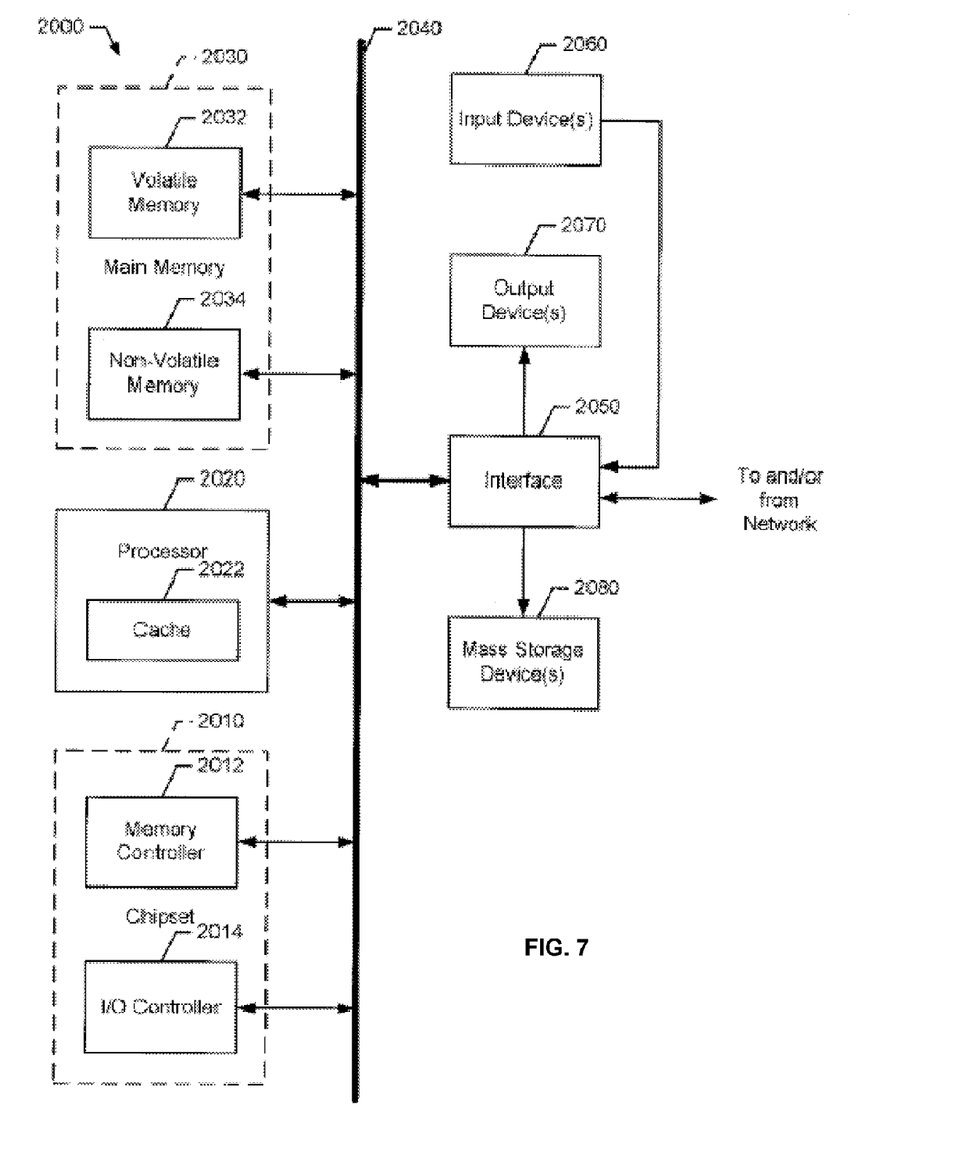
FIG. 7 schematically illustrates an example processor based system that may be used to practice various embodiments described herein.

FIG. 7 schematically illustrates an example processor based system that may be used to practice various embodiments described herein. The processor system 2000 may be a desktop computer, a laptop computer, a handheld computer, a tablet computer, a PDA, a server, an Internet appliance, and/or any other type of computing device. In some embodiments, the processor system 2000 may be capable of functioning as a mobile station (e.g., the MS 15 of FIGS. 1-2), a base station (e.g., BS 40 or 42) of a wireless communication network, or provide logic that performs similar functions.

The processor system 2000 illustrated in FIG. 7 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. The processor 2020 may include a cache 2022, which may be implemented using a first-level unified cache (L1), a second-level unified cache (L2), a third-level unified cache (L3), and/or any other suitable structures to store data. The processor 2020 may be configured to communicate with a mobile station or one or more OTA servers of a wireless network.

The memory controller 2012 may perform functions that enable the processor 2020 to access and communicate with a main memory 2030 including a volatile memory 2032 and a non-volatile memory 2034 via a bus 2040. While FIG. 7 shows a bus 2040 to communicatively couple various components to one another, other embodiments may include additional/alternative interfaces.

The volatile memory 2032 may be implemented by synchronous dynamic random access memory (SDRAM), dynamic random access memory (DRAM), RAMBUS dynamic random access memory (RDRAM), and/or any other type of random access memory device. The non-volatile memory 2034 may be implemented using flash memory, read only memory (ROM), electrically erasable programmable read only memory (EEPROM), and/or any other desired type of memory device.

An article of manufacture is disclosed herein. The article of manufacture may include a computer-readable medium having instructions stored thereon that if executed, result in the actions described herein. The computer-readable medium may include, for example, components of main memory 2030 and/or the mass storage device(s) 2080 or any other suitable storage medium.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

In some embodiments, the processor system 2000 may be coupled to an antenna structure (not shown in the figure) to provide access to other devices of a network. In some embodiments, the antenna structure may include one or more directional antennas, which radiate or receive primarily in one direction (e.g., for 120 degrees), cooperatively coupled to one another to provide substantially omnidirectional coverage; or one or more omnidirectional antennas, which radiate or receive equally well in all directions. In some embodiments, the antenna structure may include one or more directional and/or omnidirectional antennas, including, e.g., a dipole antenna, a monopole antenna, a patch antenna, a loop antenna, a microstrip antenna or any other type of antennas suitable for OTA transmission/reception of RF signals.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 7 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A method comprising:
   receiving, by a base station of a wireless communication network from a mobile station, a message that includes:
      a bit having a value to indicate that the mobile station is in coverage loss recovery,
      a mobile station identifier to identify the mobile station, and
      a base station identifier if the base station performing said receiving the message from the mobile station is different from a previous-serving base station of the mobile station;
   determining whether a static context and/or a dynamic context associated with the mobile station identifier is stored at the a previous-serving base station based at least in part on the base station identifier; and
   transmitting a message to the mobile station to indicate which re-entry actions are to be performed to facilitate re-entry of the mobile station to the wireless communication network, wherein the re-entry actions are based at least in part on said determining whether the static context and/or the dynamic context associated with the mobile station is stored at the previous-serving base station of the mobile station;
   wherein said transmitting a message to the mobile station indicates that the re-entry actions include a request that the mobile station maintain a previous automatic repeat request (ARQ) state of the mobile station and update the ARQ state via an explicit acknowledgement to the base station and wherein the re-entry actions do not include full authentication and capability negotiation if it is determined that the static context and/or the dynamic context associated with the mobile station identifier is stored at the previous-serving base station of the mobile station.

2. The method of claim 1, further comprising:
   signaling a network node to obtain a static context associated with the mobile station identifier that is stored remotely on a network side if it is determined that the static context and/or the dynamic context is not stored at the previous-serving base station of the mobile station.

3. The method of claim 2, wherein said transmitting a message to the mobile station indicates that the re-entry actions include resetting of a medium access control (MAC) layer data path and partial authentication with an authentication code exchange and do not include full authentication and capability negotiation if it is determined that the static context and/or the dynamic context is not stored at the previous-serving base station of the mobile station.

4. The method of claim 1, further comprising:
   detecting, by the previous-serving base station, coverage loss of the mobile station;
   starting a timer based on said detecting the coverage loss; and
   deleting the dynamic context that is stored at the previous-serving base station and associated with the mobile station identifier, said deleting the dynamic context being subsequent to expiration of the timer.

5. The method of claim 4, further comprising:
   signaling a network node to remotely store a static context associated with the mobile station identifier;
   wherein said deleting the dynamic context is performed subsequent to signaling the network node.

6. The method of claim 5, wherein said signaling a network node to remotely store a static context associated with the mobile station identifier is performed in response to expiration of the timer.

7. The method of claim 1, wherein the message received from the mobile station further includes a cipher-based message authentication code (CMAC) digest to facilitate secure communication between the base station and the mobile station.

8. The method of claim 1, wherein the bit is a bit in a Ranging Purpose Indication parameter of a RNG-REQ message.

9. The method of claim 1, wherein the base station is configured to receive the message from the mobile station using a protocol compatible with an Institute for Electrical and Electronic Engineers (IEEE) 802.16 standard or Worldwide Interoperability for Microwave Access (WiMAX) standard.

10. A method comprising:
transmitting, by a mobile station to a base station of a wireless communication network, a message that includes:
a bit having a value to indicate that the mobile station is in coverage loss recovery,
a mobile station identifier to identify the mobile station, and a base station identifier if the base station is different from a previous-serving base station of the mobile station, the base station identifier to facilitate a determination by the base station whether a static context and/or a dynamic context associated with the mobile station is stored at the previous-serving base station; and
receiving a message from the base station that indicates which re-entry actions are to be performed to facilitate re-entry of the mobile station to the wireless communication network;
wherein said receiving a message from a base station indicates that the re-entry actions include a request that the mobile station maintain a previous automatic repeat request (ARQ) state of the mobile station and update the ARQ state via an explicit acknowledgement to the base station and wherein the re-entry actions do not include full authentication and capability negotiation if it is determined that the static context and/or the dynamic context associated with the mobile station identifier is stored at the previous-serving base station of the mobile station.

11. The method of claim 10, wherein said receiving the message from the base station indicates that the re-entry actions include a partial authentication with an authentication code exchange and do not include full authentication and capability negotiation.

12. The method of claim 10, wherein said receiving the message from the base station indicates that the re-entry actions include resetting of a medium access control (MAC) layer data path and partial authentication with an authentication code exchange and do not include full authentication and capability negotiation.

13. The method of claim 10, further comprising:
detecting, by the mobile station, coverage loss of the mobile station; and
scanning to discover the base station for re-entry to the wireless communication network, said scanning being performed prior to said transmitting the message.

14. The method of claim 13, further comprising:
determining, by the mobile station, whether a security context used by the mobile station in the wireless communication system is valid, wherein said transmitting the message includes a newly derived message authentication code and/or a request for a full authentication to refresh all security keys if it is determined that the security context is not valid.

15. The method of claim 10, further comprising:
performing, by the mobile station, the re-entry actions indicated in the message received from the base station to facilitate re-entry of the mobile station to the wireless communication network.

16. A system comprising:
a processor configured to communicate with a mobile station of a wireless communication network via a base station of the wireless communication network; and
a storage medium coupled to the processor, the storage medium having instructions stored thereon, that if executed by the processor, result in
receiving a message that includes:
a bit having a value to indicate that the mobile station is in coverage loss recovery,
a mobile station identifier to identify the mobile station, and
a base station identifier if the base station is different from a previous-serving base station of the mobile station;
determining whether a static context and/or a dynamic context associated with the mobile station identifier is stored at the previous-serving base station based at least in part on the base station identifier; and
transmitting a message to the mobile station to indicate which re-entry actions are to be performed to facilitate re-entry of the mobile station to the wireless communication network, wherein the re-entry actions are based at least in part on said determining whether the static context and/or the dynamic context associated with the mobile station is stored at the previous-serving base station of the mobile station;
wherein said transmitting a message to the mobile station indicates that the re-entry actions include a request that the mobile station maintain a previous automatic repeat request (ARQ) state of the mobile station and update the ARQ state via an explicit acknowledgement to the base station and wherein the re-entry actions do not include full authentication and capability negotiation if it is determined that the static context and/or the dynamic context associated with the mobile station identifier is stored at the previous-serving base station of the mobile station.

17. The system of claim 16, wherein the instructions, if executed, further result in:
storing the static context and/or the dynamic context associated with the mobile station at the base station;
detecting coverage loss of the mobile station; and
signaling a network node to remotely store the static context associated with the mobile station.

18. The system of claim 17, wherein the instructions, if executed, further result in:
starting a timer based on said detecting the coverage loss of the mobile station; and
deleting the static context and/or the dynamic context that is stored at the base station, said deleting the static context and/or dynamic context being subsequent to expiration of the timer.

19. The system of claim 18, wherein said signaling a network node to remotely store the static context associated with the mobile station is performed in response to expiration of the timer.

20. The system of claim 16, wherein the instructions, if executed, further result in:
signaling a network node to obtain the static context associated with the mobile station that is stored remotely on a network side if it is determined that the static context and/or the dynamic context is not stored at the base station.

21. The system of claim 16, wherein said transmitting a message to the mobile station indicates that the re-entry actions include resetting of a medium access control (MAC) layer data path and partial authentication with an authentication code exchange and do not include full authentication and capability negotiation if it is determined that the static context and/or the dynamic context is not stored at the base station.

22. An apparatus comprising:
an antenna;
a processor configured to communicate with a base station of a wireless communication network via the antenna; and
a storage medium coupled to the processor, the storage medium having instructions stored thereon, that if executed by the processor, result in
detecting, by a mobile station, coverage loss of the mobile station;
transmitting, by the mobile station to the base station, a message that includes:
   a bit having a value to indicate that the mobile station is in coverage loss recovery,
   a mobile station identifier to identify the mobile station, and
   a base station identifier if the base station is different from a previous-serving base station of the mobile station, the base station identifier to facilitate a determination by the base station whether a static context and/or a dynamic context associated with the mobile station is stored at the previous-serving base station; and
receiving a message from the base station that indicates which re-entry actions are to be performed to facilitate re-entry of the mobile station to the wireless communication network;
wherein said receiving a message from a base station indicates that the re-entry actions include a request that the mobile station maintain a previous automatic repeat request (ARQ) state of the mobile station and update the ARQ state via an explicit acknowledgement to the base station and wherein the re-entry actions do not include full authentication and capability negotiation if it is determined that the static context and/or the dynamic context associated with the mobile station identifier is stored at the previous-serving base station of the mobile station.

23. The apparatus of claim 22, wherein the instructions, if executed, further result in:
receiving a message from the base station that indicates which re-entry actions are to be performed to facilitate re-entry of the mobile station to the wireless communication network.

24. The apparatus of claim 23, wherein said receiving the message from the base station indicates that the re-entry actions include a partial authentication with an authentication code exchange and do not include full authentication and capability negotiation.

25. The apparatus of claim 23, wherein said receiving the message from the base station indicates that the re-entry actions include resetting of a medium access control (MAC) layer data path and partial authentication with an authentication code exchange and do not include full authentication and capability negotiation.

26. The apparatus of claim 22, wherein the instructions, if executed, further result in:
scanning to discover the base station for re-entry to the wireless communication network; and
determining, by the mobile station, whether a security context used by the mobile station in the wireless communication system is valid, wherein said transmitting the message includes a newly derived cipher-based message authentication code (CMAC) and/or a request for full authentication to refresh all security keys if the security context is not valid.

* * * * *

UNITED STATES PATENT AND TRADEMARK OFFICE
CERTIFICATE OF CORRECTION

| | |
|---|---|
| PATENT NO. | : 8,638,751 B2 |
| APPLICATION NO. | : 12/826639 |
| DATED | : January 28, 2014 |
| INVENTOR(S) | : Muthaiah Venkatachalam et al. |

It is certified that error appears in the above-identified patent and that said Letters Patent is hereby corrected as shown below:

In the Claims

<u>Column 14</u>

Line 3, [Claim 1] "…at the a previous-serving base station…" should read --…at the previous-serving base station…--.

Signed and Sealed this
Ninth Day of June, 2015

Michelle K. Lee
*Director of the United States Patent and Trademark Office*